(12) United States Patent
Deletoille et al.

(10) Patent No.: US 10,894,611 B2
(45) Date of Patent: Jan. 19, 2021

(54) LIGHTNING PROTECTION SYSTEM FOR AN AIRCRAFT

(71) Applicant: Airbus Operations S.A.S., Toulouse (FR)

(72) Inventors: Didier Deletoille, Blagnac (FR); Frédéric Forget, Saint Cricq (FR)

(73) Assignee: Airbus Operations S.A.S.

( * ) Notice: Subject to any disclaimer, the term of this patent is extended or adjusted under 35 U.S.C. 154(b) by 403 days.

(21) Appl. No.: 15/911,836

(22) Filed: Mar. 5, 2018

(65) Prior Publication Data

US 2018/0257789 A1    Sep. 13, 2018

(30) Foreign Application Priority Data

Mar. 7, 2017 (FR) .................................. 17 51843

(51) Int. Cl.
| | |
|---|---|
| *B64D 45/02* | (2006.01) |
| *B64F 1/36* | (2017.01) |
| *H02G 13/00* | (2006.01) |
| *H02H 9/04* | (2006.01) |
| *H02J 7/00* | (2006.01) |
| *H02J 7/02* | (2016.01) |
| *H01R 31/06* | (2006.01) |
| *H01R 13/66* | (2006.01) |

(52) U.S. Cl.
CPC ............... *B64D 45/02* (2013.01); *B64F 1/36* (2013.01); *B64F 1/364* (2013.01); *H02G 13/20* (2013.01); *H02H 9/042* (2013.01); *H02J 7/0029* (2013.01); *H02J 7/0042* (2013.01); *H02J 7/027* (2013.01); *H01R 13/6666* (2013.01); *H01R 31/065* (2013.01); *H01R 2201/26* (2013.01)

(58) Field of Classification Search
CPC ............ B64D 45/02; B46F 1/36; B46F 1/364; H02G 13/20; H01R 13/6666
See application file for complete search history.

(56) References Cited

U.S. PATENT DOCUMENTS

| | | | | |
|---|---|---|---|---|
| 5,224,878 | A | * | 7/1993 | Lurie ................. H01R 13/7195 439/620.12 |
| 2009/0243758 | A1 | * | 10/2009 | Januszewski ............ H03H 1/00 333/184 |

(Continued)

FOREIGN PATENT DOCUMENTS

FR            3028101 A1    5/2016

OTHER PUBLICATIONS

FR 1751843 Search Report dated Oct. 27, 2017.

*Primary Examiner* — Scott Bauer
(74) *Attorney, Agent, or Firm* — Lerner, David, Littenberg, Krumholz & Mentlik, LLP

(57) ABSTRACT

A lightning protection system of an aircraft when it is electrically powered on the ground by a generator set is described. Such an aircraft consequently includes a fuselage and a connecting connector to allow the connection to the generator set. The connecting connector includes a frame, male electrical contacts protruding on either side of said frame, and a lightning protection system inserted between the male electrical contacts and electrical elements of the aircraft. The protection system includes peak-clipping devices for clipping an electrical signal and a printed circuit having conductive tracks linking the male electrical contacts to the peak-clipping devices.

3 Claims, 2 Drawing Sheets

(56) References Cited

U.S. PATENT DOCUMENTS

2010/0197159 A1    8/2010  Gosis et al.
2011/0269325 A1*  11/2011  Gosis ............... H01R 13/62933
                                                               439/265
2016/0122037 A1    5/2016  Forget

* cited by examiner

LIGHTNING PROTECTION SYSTEM FOR AN AIRCRAFT

FIELD OF THE INVENTION

The invention relates to a lightning protection system for an aircraft when it is electrically powered on the ground by a generator set.

BACKGROUND OF THE INVENTION

FIG. 1 shows an aircraft A, stopped on the ground, supplied with electricity by a generator set 40 using a power supply cable 42 comprising several electrical conductors and, at the end of which, there is an end connector 41 having an electrical contact for each electrical conductor. As a nonlimiting example, such a power supply cable 42 has six electrical conductors and the end connector 41 has six electrical contacts.

To allow the connection with the generator set 40, the aircraft A has a connecting connector 10 having, for each electrical conductor of the power supply cable 42 from the generator set 40, an electrical contact downstream of which a conductor 60 embedded in the aircraft A is connected and to which at least one electrical element 50 of the aircraft A is connected.

The connection of the generator set 40 to the aircraft A creates a loop.

When lightning strikes the ground in the vicinity of the aircraft A, a part of the magnetic field induced by the lightning generates a voltage drop in the loop, creating an inductive coupling which generates an electrical overvoltage in the power supply cable 42. This electrical overvoltage is propagated to the aircraft A with the risk of damaging certain electrical elements 50 of the aircraft A. Each aircraft A can have a specific electrical overvoltage tolerance threshold.

In order to guarantee the integrity of the aircraft, a solution presented in the patent application published under the number FR3028101 consists in connecting a safety device 70 between the end connector 41 and the connecting connector 10, said device 70 being adapted to the electrical overvoltage tolerance threshold specific to a considered aircraft category. Such a device 70 generally takes the form of a housing and comprises peak-clipping means. When it is used, an airport agent manually joins said housing to the end connector 41, then connects everything to the connecting connector 10. Such a device 70 is generally very heavy. The work of the airport agents is therefore penalized. Furthermore, since said devices are specific to each aircraft category, the handling of such devices is complex and it is possible for the agent to forget to connect such a protection housing to the end connector 41. Finally, for safety purposes, such devices 70 are generally sealed, preventing or limiting the maintenance thereof.

BRIEF SUMMARY OF THE INVENTION

The aspects of the invention makes it possible to address in a particularly effective way all or part of the abovementioned drawbacks by proposing a lightning protection system when an aircraft is electrically powered by a generator set.

An aspect of the invention relates to an aircraft comprising a fuselage and a connecting connector to allow a connection to a generator set, the connector being fixed to said fuselage via a frame, and comprising male electrical contacts having an internal part and an external part respectively protruding on either side of the frame, the external part being arranged to be able to be associated, in position of use, with the generator set, the internal part being arranged to cooperate with electrical elements of the aircraft through an embedded conductor, characterized in that the connecting connector further comprises a lightning protection system, inserted between the male electrical contacts and the electrical elements of the aircraft, said system comprising peak-clipping means designed to clip an electrical signal and a printed circuit having conductive tracks linking the internal part of the electrical contact to the peak-clipping means.

Advantageously, one of the male electrical contacts is the neutral, and in that, between each internal part of a male electrical contact other than the neutral and the internal part of the male electrical contact corresponding to the neutral, there is a peak-clipping means.

Advantageously, each peak-clipping means is an assembly of at least one diode mounted in series between a male electrical contact other than the neutral and the neutral electrical contact.

In order to allow the maintenance of lightning protection system of an aircraft, a test point is inserted between the peak-clipping means and the neutral electrical contact.

To allow access to the test points, the frame comprises orifices ensuring access to the test point.

BRIEF DESCRIPTION OF THE DRAWINGS

Other features and advantages will emerge more clearly on reading the following description, relating to an exemplary embodiment given in an indicative and nonlimiting manner, and on studying the accompanying figures, among which.

DETAILED DESCRIPTION

Figure 1:
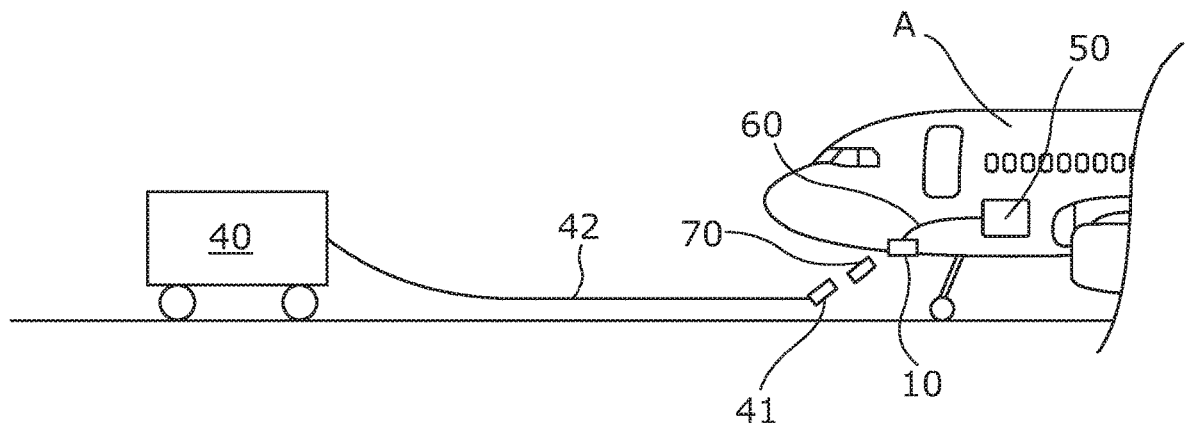
FIG. 1 shows an aircraft when it is electrically powered on the ground by a generator set, according to the prior art.
Figure 2:
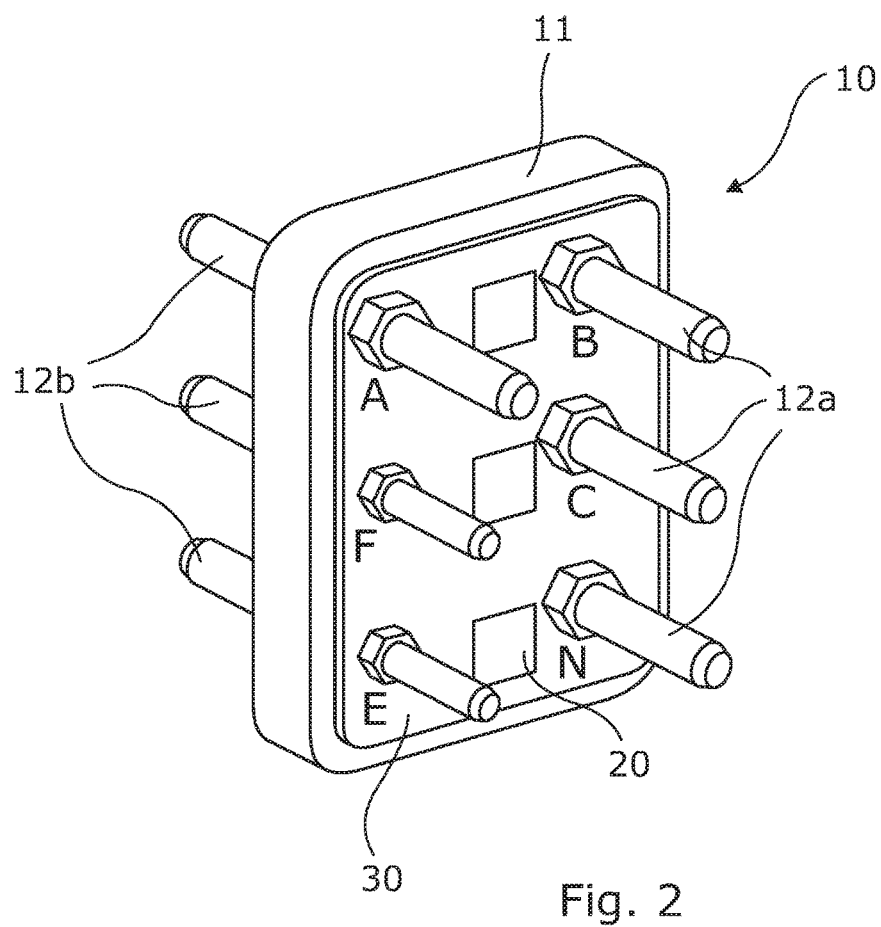
FIG. 2 shows an embodiment according to the invention of a lightning protection system for an aircraft.

FIG. 2 presents a connecting connector 10 incorporated in the fuselage of an aircraft A, allowing the connection of the aircraft A with a generator set 40 as illustrated in FIG. 1. The connecting connector 10 comprises, according to an embodiment of the invention, a lightning protection system. This connecting connector 10 comprises a frame 11 on which electrical contacts are fixed. As a nonlimiting example, the connecting connector 10 represented in FIG. 2 has six male electrical contacts A, B, C, F, E and N. According to an example represented in FIG. 3, the electrical contacts A, B and C can conduct a low voltage current, for example of the order of 115-200 V at 400 Hz, the associated electrical conductors being phases. The electrical contacts E and F can conduct a very low voltage current, for example or the order of 28 V at 0.5 A, the associated electrical conductors generally being called "discrete control conductors". The electrical contact N corresponds to the neutral.

Each male electrical contact A, B, C, F, E and N has an internal part 12a and an external part 12b respectively protruding on either side of the frame 11, as represented in FIG. 2. The internal part 12a is arranged to be able to cooperate with the embedded conductor 60 of the aircraft A to which at least one electrical element 50 of the aircraft A is connected. The external part 12b is arranged to be able to cooperate in a known manner with the end connector 41 of the generator set 40.

The protection system of the connector 10 comprises peak-clipping means 20 provided to clip an electrical signal. The peak-clipping means 20 and the internal part of each electrical contact A, B, C, E and F are connected to the conductive track means of a printed circuit 30.

According to a preferential embodiment, a peak-clipping means 20 is positioned between the internal part of the electrical contact corresponding to the neutral N and each internal part of an electrical contact other than the neutral, namely electrical contacts A, B, C, E and F in our embodiment.

Preferentially, each peak-clipping means 20 is an assembly of a diode or several diodes mounted in series between a male electrical contact A, B, C, E and F and the neutral of electrical contact N. In this embodiment, when the voltage in the electrical conductor 41 exceeds a predefined limit voltage of each diode, commonly called "inversion voltage", "clipping voltage" or "clamping voltage", said diodes switch from a blocking state to a conducting state and discharge the electrical overvoltage to the neutral N linked to the ground of the aircraft A.

For each electrical contact A, B, C, E, F, other than the neutral N, the characteristics and the number M of diodes 202, 204 are chosen as a function of the specific features of the aircraft and of the generator set considered.

The characteristics of a diode are:
the transition time between the blocking state and the passing state,
the maximum current intensity that can circulate in the diode 202, 204, and
the limit voltage from which the diode becomes conducting (or passing).

The conditions of use are:
the intensity of the current upon the overvoltage,
for each electrical conductor 41, the maximum voltage circulating in said electrical conductor (with, preferably, a margin of 10 to 15% corresponding to the conventional fluctuations of the voltage circulating in a generator set 20), and
the time during which each electrical element 50 of the aircraft A to be protected can accept an overvoltage without damage.

For an electrical conductor 41 and the associated embedded conductor 60, each diode 202, 204 is first of all chosen such that its transition time is less than the time during which the electrical element 50 to be protected and electrically connected to said embedded conductor 60, can accept an overvoltage without damage, then, out of these diodes 202, 204, only the diodes 202, 204 for which the maximum current intensity that can circulate therein is greater than the intensity of the current upon the overvoltage are retained.

For each model of diodes 202, 204 satisfying these two criteria and for each electrical conductor, the number M of diodes is then the integer which is immediately greater than the ratio between the maximum voltage circulating in the electrical conductor, and the limit voltage of the diode 202, 204.

For the purposes of optimization, the diode 202, 204 for which M is the smallest is chosen.

It is also possible to take account of additional criteria. For example, diodes 202, 204 having a lower residual voltage will be preferred, or diodes 202, 204 that can dissipate a greater power will be preferred.

Figure 3:
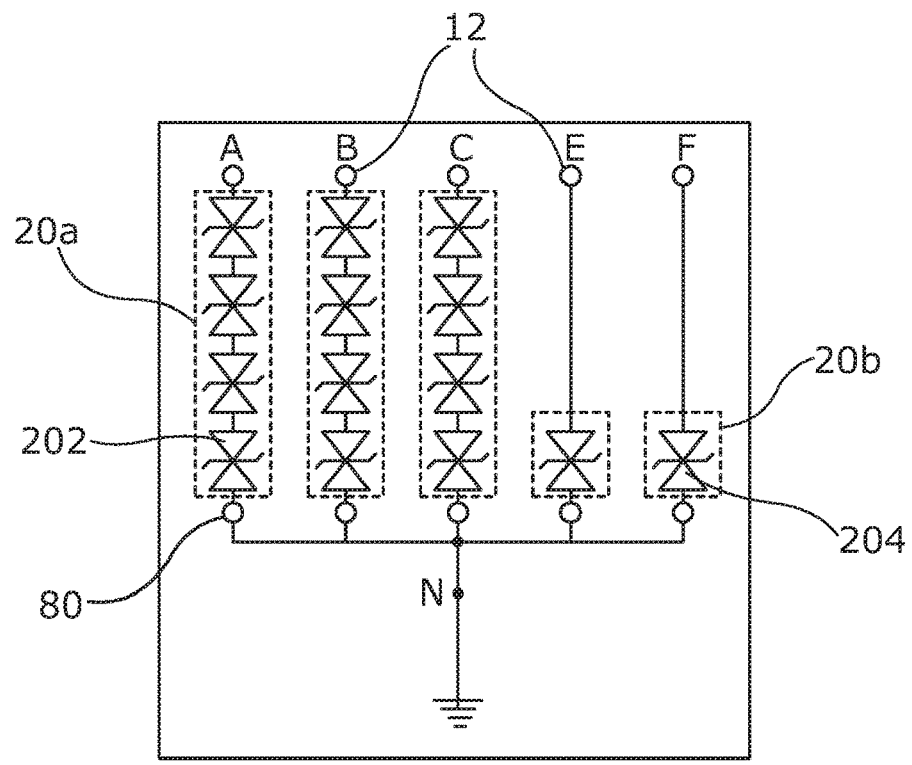
FIG. 3 shows an electrical diagram of a peak-clipping means according to an embodiment of the invention.

According to an exemplary embodiment illustrated in FIG. 3, the peak-clipping means 20a is composed of four identical diodes 202 mounted in series and the peak-clipping means 20b is composed of a diode 204.

According to a variant of the invention, the peak-clipping means can also consist of a set of varistors or of any other means making it possible to clip an electrical signal.

Preferentially, the protection system of the connector 10 is housed in the volume of the frame 11. As a variant, such a system can consist of a housing housed in the fuselage in proximity to the connecting connector 10.

Figure 4:
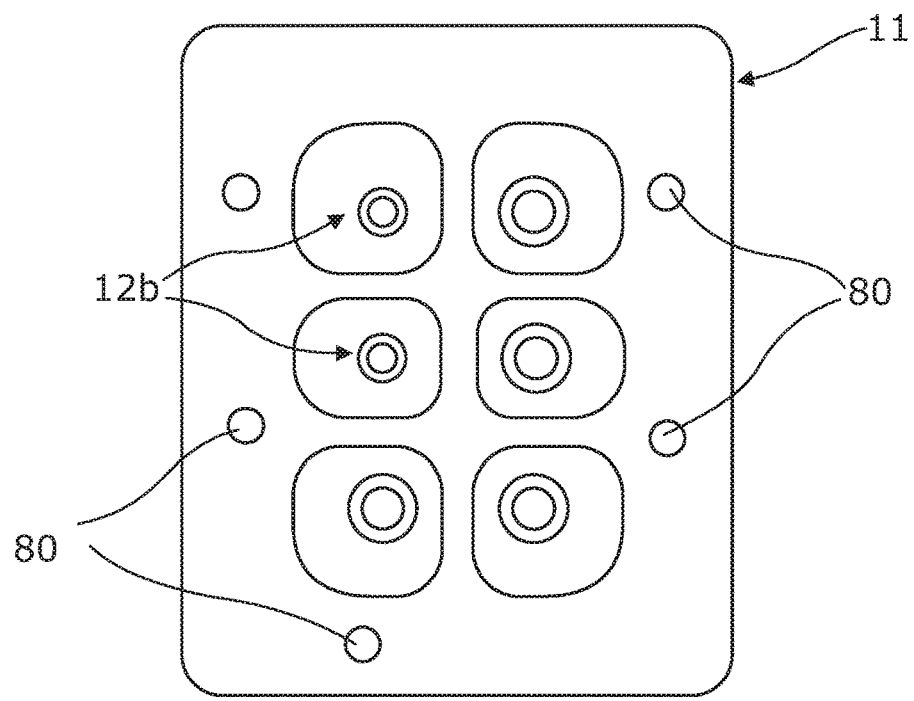
FIG. 4 shows a connecting connector having test points.

In order to facilitate the maintenance of the lightning protection system according to the invention, said system comprises test points 80 between the peak-clipping means 20 and the neutral electrical contact N, making it possible to connect a measurement means thereto, such as a multimetre for example. The frame 11 of the connecting connector 10 consequently comprises orifices, not represented in the figures, allowing access from the outside of the frame to the test points 80. As a variant, the test points 80 can consist of electrical contacts situated on the face of the frame 11 located outside of the fuselage, as represented in FIG. 4, in order to allow the connection of a multimetre. Such a test arrangement advantageously makes it possible to check the correct operation of each peak clipping means of the protection system.

Advantageously, it will be understood on reading the description of the connecting connector 10 provided for a protection system according to the invention, that the airport agents no longer have to worry about incorporating an external housing 70 with the end connector of the generator set, as represented in FIG. 1. The aircraft A is protected by protection arrangement incorporated in the connecting connector 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An aircraft comprising:
a fuselage; and
a connecting connector to allow a connection to a generator set, the connecting connector being fixed to said fuselage via a frame and comprising male electrical contacts having an internal part and an external part respectively protruding on either side of the frame, the external part being arranged to be able to be associated, in position of use, with the generator set, the internal part being arranged to cooperate with electrical elements of the aircraft through an embedded conductor,
wherein the connecting connector further comprises a lightning protection system inserted between the male electrical contacts and electrical elements of the aircraft, said lightning protection system comprising at least one peak-clipping means configured to clip an electrical signal and a printed circuit having conductive tracks linking the internal part of the electrical contact to the peak-clipping means, wherein one of the male electrical contacts is the neutral (N), and wherein, between each internal part of a male electrical contact other than the neutral and the internal part of the male electrical contact corresponding to the neutral, there is one of the at least one peak-clipping means, wherein the connector further comprises a test point inserted between the at least one peak-clipping means and the neutral electrical contact (N).

2. The aircraft according to claim 1, wherein each of the at least one peak-clipping means is an assembly of at least one diode mounted in series between a male electrical contact other than the neutral and the neutral electrical contact (N).

3. The aircraft according to claim 1, wherein the frame comprises an orifice ensuring access to each of the test points.

\* \* \* \* \*